United States Patent [19]

Elmer et al.

[11] 3,755,689

[45] Aug. 28, 1973

[54] TWO-PHASE THREE-CLOCK MOS LOGIC CIRCUITS

[75] Inventors: Ben R. Elmer, Glendale; Melvin H. Eklund, Phoenix, both of Ariz.

[73] Assignee: Honeywell Information Systems Inc., Phoenix, Ariz.

[22] Filed: Dec. 30, 1971

[21] Appl. No.: 214,048

[52] U.S. Cl. .................................. 307/205, 307/251
[51] Int. Cl. ............................................ H03k 19/08
[58] Field of Search ................ 307/205, 221 C, 251, 307/279, 304

[56] References Cited

UNITED STATES PATENTS

| | | | |
|---|---|---|---|
| 3,610,951 | 10/1971 | Howland | 307/205 |
| 3,593,037 | 7/1971 | Hoff | 307/205 |
| 3,480,796 | 11/1969 | Polkinghorn | 307/205 |
| 3,675,043 | 7/1972 | Bell | 307/251 |
| 3,622,798 | 11/1971 | Ochi | 307/279 |
| 3,638,036 | 1/1972 | Zimbelmann | 307/205 |
| 3,577,005 | 5/1971 | Christensen | 307/205 |

*Primary Examiner*—John W. Huckert
*Assistant Examiner*—Ro E. Hart
*Attorney*—Dudley T. Ready, Edward W. Hughes et al.

[57] ABSTRACT

Ratioless MOS logic circuits are disclosed which use two non-overlapping clocks for two-phase control of signal propagation and a third precharge clock, of shorter duration, at double the repetition rate of the first two clocks for precharging storage node capacitance. In each circuit, an electrical network is provided having a transistor connected as a precharge diode for applying the precharge clock to the storage node capacitance through a clocked transfer gate transistor. A logic network is provided having a net of transistors connected, in parallel with the precharge diode transistor, as a relay logic network to selectively discharge the storage node capacitor, after the precharge clock. Where required, a novel dynamic buffer is provided having an output which is essentially insensitive to crossover capacitance effects.

3 Claims, 3 Drawing Figures

TWO-PHASE THREE-CLOCK MOS LOGIC CIRCUITS

FIELD OF THE INVENTION

This invention relates to logic circuits implemented with MOS transistors, i.e., metal-oxide-semiconductor transistors or their equivalents. It is primarily concerned with providing improved ratioless circuits suitable for implementation of large scale integrated (LSI) circuits having a functional complexity equivalent to several hundred gates.

DESCRIPTION OF THE PRIOR ART

In the past, MOS logic has usually been implemented with ratio circuits, largely analogous to traditional logic, with information signals formed by selectively switching a transistor connected between a power supply voltage and a load resistor, basically a voltage divider approach. Such ratio circuits all involve a nontrivial amount of power consumption per gate. For LSI implementation, the resulting heat dissipation and power supply requirements place major constraints on design when hundreds or thousands of gates are involved.

Over the years, design practice has evolved standard cell logic concepts, where the cell complexity is approximately a small scale integrated circuit (SSI), which enable systemized approaches to the design of devices and systems. Conventional design usually results in a system of standard cells, such as four-input NAND gates, J-K flip-flops, half-adders, etc. Extensive success has been achieved in providing computer design aids to automate many of the steps of the design process, even aiding mask generation for processing semiconductor wafers. However, these design aids are often incompatible with ratioless circuits.

It has always been apparent that MOS transistors differ functionally from standard bipolar transistors in that they are bidirectional devices, much like relays. In general, the drain and source connections can be interchanged without affecting circuit operation. Straightforward ratio logic design using MOS transistors involves much of the power consumption problems of bipolar ratio circuits. These can be largely obviated by storing bits as charged or discharged capacitors. This approach presents many problems. The main problem is that practical systems include a complex set of undesired capacitance effects, particularly with run crossovers, that modify predicted circuit operation. Another problem is that the bidirectional signal propagation characteristic implies special techniques for steering signals.

Probably the most successful approach in the past has been four-phase logic, which requires several pins for operating voltages and it is very difficult to use efficiently. The most severe problem for ratioless circuits has been known to be crossover parasitics. The capacitors used for storing bits are of the same order as the inherent capacitance of the signal connection runs. In fact, this parasitic capacitance alone is often used as the storage capacitor. This results in a situation where crossover runs potentially create noise problems and signal loss through capacitance-divider effects.

When a first connection run is in a charged state, and one or more connection runs cross over it, the voltage level may drop to a point which makes the circuit effectively inoperative. Because of such factors, four-phase ratioless designs cannot be made with the same degree of confidence that generally exists for ratio logic design. It is often necessary to modify designs, which involves substantial costs such as for generating new masks. The efficiency problem with four-phase circuits is due to the characteristic that useful logic is only performed 25 percent of the time in a given logic circuit.

Two-phase ratioless logic circuits also have been devised. These circuits are generally characterized by having a storage capacitor node between a precharge diode transistor and a transfer gate transistor. This requires a large capacitance, larger by a factor of several times the sum of the useful load capacitance and the undesirable parasitic capacitance. Such a requirement makes such circuits impractical for general purpose logic applications.

The advantages of MOS integrated circuits, which include simpler fabrication, high yield factors and absence of an isolation diffusion step, as compared with conventional bipolar integrated circuits, are very attractive. Furthermore, ratioless circuits, using complex relay-like logic networks with individual logic circuits can provide efficient and economical systems when the ratioless integrated circuits can be designed efficiently and reliably.

It is accordingly an object of the invention to provide ratioless logic circuits which can be efficiently and reliably designed into integrated circuits.

It is a further object of the invention to provide a dynamic buffer suitable for line drivers and use where protection from crossover parasitics is desired.

SUMMARY OF THE INVENTION

Ratioless MOS logic circuits are provided which have as a primary characteristic the use of a single precharge clock bus which directly charges all information storage node capacitors. This enables forming all precharge connections in the primary interconnection layer and provides significant layout flexibility. When combined with the two-phase clock operation, the capability for more efficient and simpler layout requirements is provided. A pair of two-phase clocks, at half the repetition rate of the precharge clock, cause a transfer gate transistor in series with a diode connected precharge transistor to charge the storage node during alternate phases. During the phase in which the storage node is charged, the phase clock remains on much longer than the precharge clock, providing an evaluation period during which the storage node is selectively discharged through the transfer gate transistor and a logic net of transistors. Preferably, the logic net is a complex series/parallel network whereby complex functions are performed during a single phase.

Figure 1:
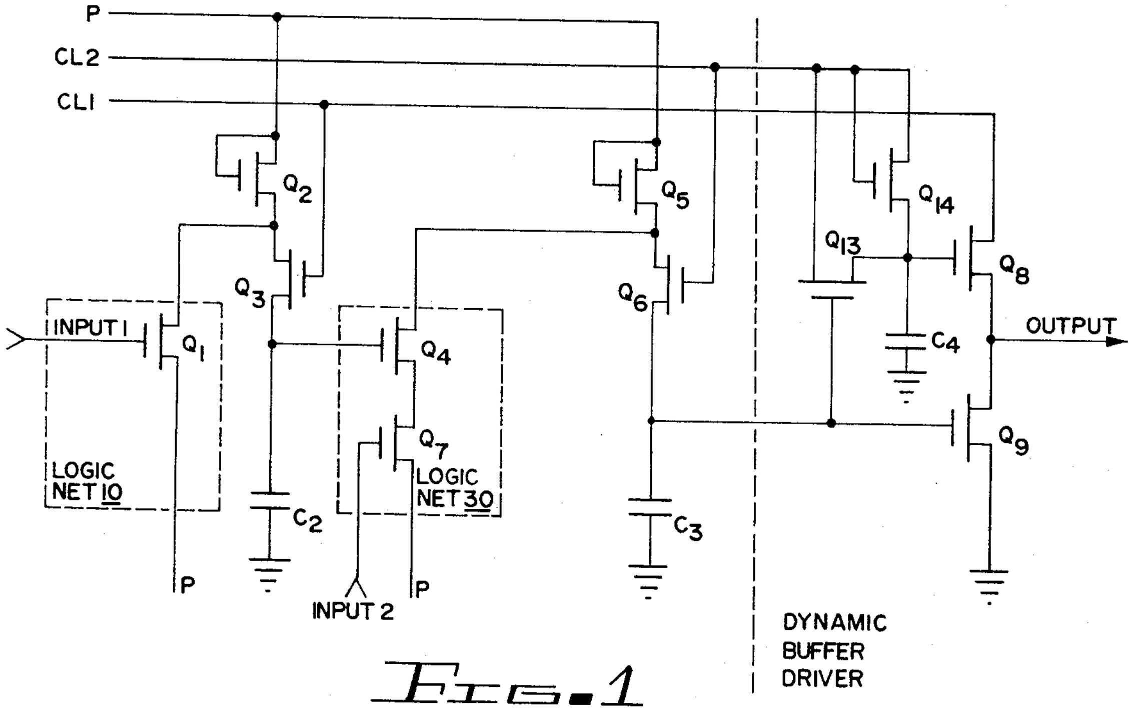
FIG. 1 is a schematic diagram of two series connected ratioless two-phase logic circuits in which the first is an inverter and the second a NAND gate which drives a dynamic buffer circuit.

In the FIG. 1 MOS logic circuits, a precharge clock P is applied to the drain and gate of MOS transistors $Q_2$ and $Q_5$, forming precharge diodes. Storage capacitors $C_2$ and $C_3$, which may consist of the parasitic capacitances on the runs interconnecting the logic circuits, represent binary "1"s and "0"s by either being charged or uncharged at the end of each phase. A charge state is assigned to "1," but the assignment is arbitrary. Transfer gates $Q_3$ and $Q_6$ are transistors which connect the precharge diodes $Q_2$ and $Q_5$ to their respective storage capacitors $C_2$ and $C_3$, when the respective phase clocks CL1 and CL2, connected to their gates, turn them on. Logic net 10 determines the state of storage capacitor $C_2$ at the end of the phase in which clock CL1 turns on transfer gate $Q_3$. The logic circuits inherently invert the logical function of their input logic nets. Logic net 10 has a single transistor $Q_1$ connecting the precharge clock P bus to the storage capacitor $C_2$ through transfer gate $Q_3$, in parallel with precharge diode $Q_2'$. Accordingly, when input 1, connected to the gate of transistor $Q_1$, turns $Q_1$ on, it provides a discharge path, after the termination of the precharge pulse, while transfer transistor $Q_3$ is still on.

Similarly, logic net 30, selectively discharges storage capacitor $C_3$. For the assignment of "1" to a negative going pulse, its series connected transistors $Q_4$ and $Q_7$, connected in parallel with precharge diode $Q_5$, form the AND function of the output of the first logic circuit and input 2. Due to the inversion characteristic of the circuit as a whole, the logic circuit output is a NAND function. If the assignment were a "0" to the negative going pulse, the NOR function would be generated. The logical functions shown for logic nets 10 and 30 are the simplest possible. It is apparent that a substantially unlimited number of series-parallel functions can be implemented using relay-like networks, and a large number of inputs can be used. However, when the number of transistors in the logic net exceeds approximately eight, it may be necessary to increase the size of the transistors or to decrease the clock repetition rates in order to insure that the storage capacitors can be discharged through the logic net, which has finite resistance.

Figure 2:
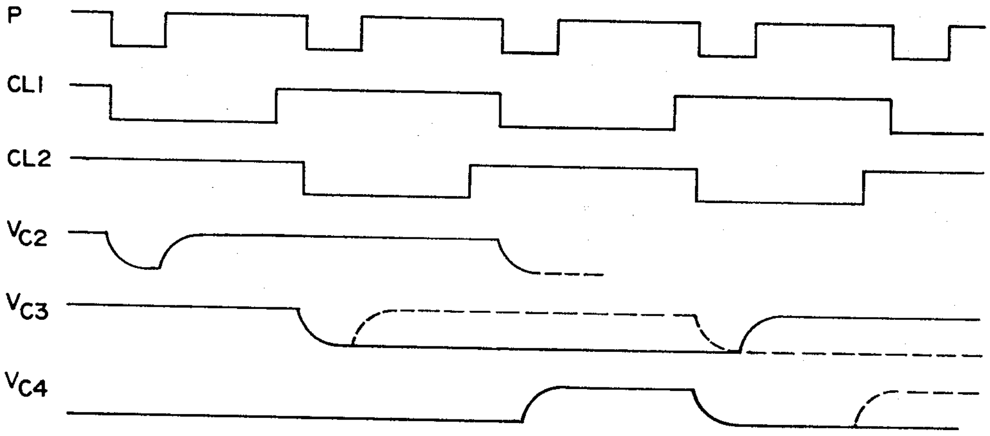
FIG. 2 is a diagram of voltage wave-forms illustrating the operation of the FIG. 1 circuits.

The waveforms of FIG. 2 illustrate the operation of the logic circuits for p-channel MOS FETs. Although n-channel MOS FETs can be used, the p-channel transistors are generally preferred because of lower susceptibility to contaminants adversely affecting the threshold levels and other well known advantages which lead to lower cost LSIs at the present time. For n-channel circuits the pulse polarities are reversed.

When clock CL1 is on, i.e., the voltage level rises in a negative direction, the precharge clock P goes on at the same time. The P clock, through precharge diode $Q_2$ and transfer gate $Q_3$, turned on by the first phase clock CL1, charges storage capacitor $C_2$. With a "1" value for input 1, which turns on transistor $Q_1$, the storage capacitor $C_2$ discharges, between the termination of clock P and the termination of the first phase clock CL1, to the P bus as shown by $V_{C2}$. This results in a "0" input to logic net 30 during the following CL2 phase, resulting in transistor $Q_4$ in logic net 30 being off during the second phase CL2. Therefore, regardless of the value of input 2, after $C_3$ is charged during CL2, it remains charged during CL2 as shown by $V_{C3}$. However, if transistors $Q_4$ and $Q_7$ were both on during CL2, the capacitor $C_3$ would be discharged, after the precharge pulse had been terminated, as indicated by the dashed portion of $V_{C3}$.

FIG. 1 also shows a buffer driver, including a pair of transistors $Q_8$ and $Q_9$ which operate as a push-pull driver. One and only one is on during CL1 (CL2 for opposite phase driver). When $Q_8$ is on, the output is a "1," essentially CL1. When $Q_9$ is on, the output is the signal ground voltage level. While storage capacitor $C_3$ is charged, clock CL2 charges a capacitor $C_4$ at the same time, through $Q_{13}$, turned on by the precharge pulse P through $Q_6$. After the termination of clock CL2, capacitor $C_4$ remains charged or is discharged, depending upon the state of capacitor $C_3$. The precharge on capacitor $C_4$ is augmented by a direct connection to clock CL2 through diode-connected transistor $Q_{14}$. If $C_3$ remains charged, it causes $C_4$ to discharge through $Q_{13}$, which $C_3$ maintains on. If $C_3$ is discharged, $Q_{13}$ is turned off and $C_4$ remains charged. As a result, logic signals are generated which are not solely dependent on the charge on a storage capacitor, after being set, having a DC path to ground or power supply during the time of interest. Accordingly, the output of this dynamic buffer driver is unaffected by parasitic capacitances. It is therefore very useful for multiple crossovers. As shown in FIG. 2 by $V_{C4}$, capacitor $C_4$ is normally charged during clock CL2 and remains so, unless discharged through $Q_{13}$ as a result of the storage node capacitor $C_3$ being in a "1" state. The dynamic buffer driver shown also inverts the signals. This is optional. By interchanging the gate connections of transistors $Q_8$ and $Q_9$, signal inversion is eliminated. Sufficient separation must be provided between clocks CL1 and CL2 to permit capacitor $C_4$ to discharge.

For a p-channel implementation of the logic circuits power supplies of +5 volts, −5 volts and −12 volts are recommended. If substrate current injection is not a problem, the substrate potential is most conveniently tied to a +5 volts.

Figure 3:
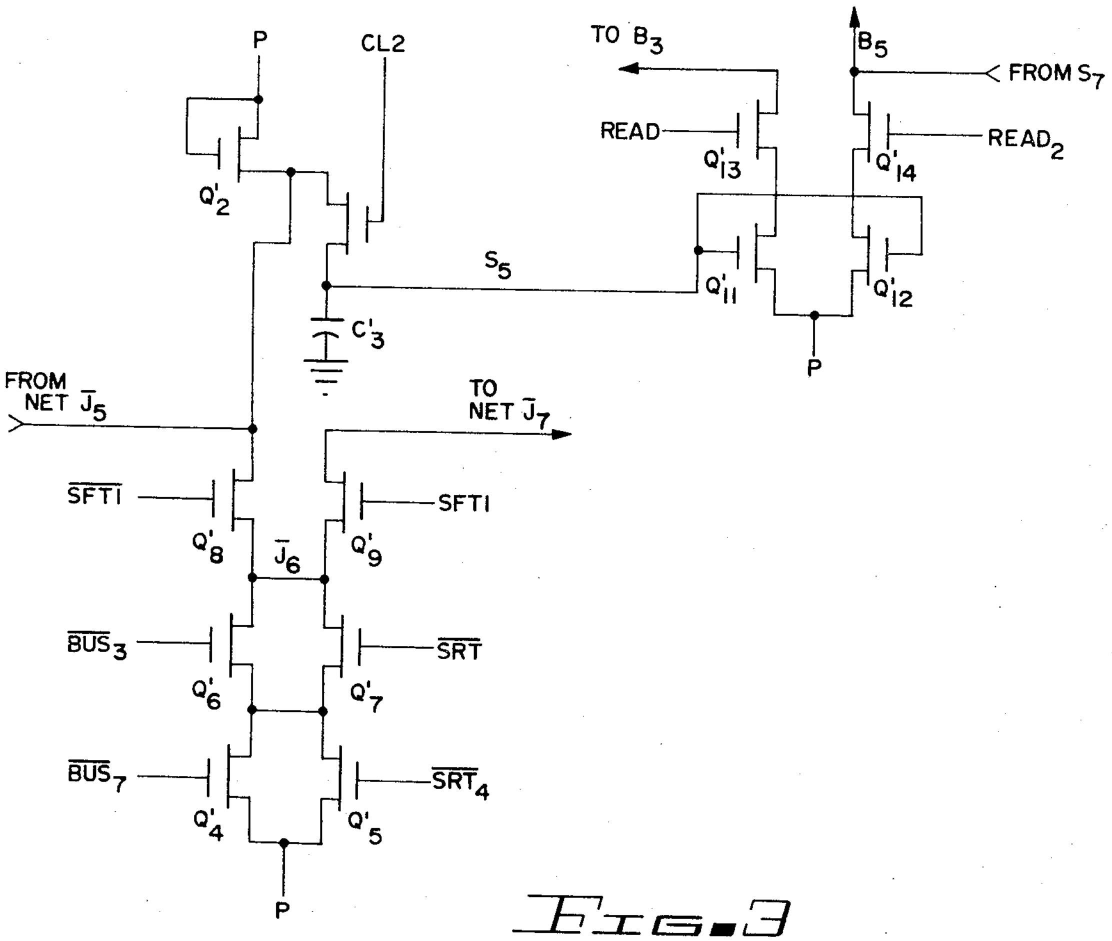
FIG. 3 is an example of the application of the invention to perform a comples function.

FIG. 3 is an example of the application of the invention to a shifter. The logic circuit shown provides the first two stages of logic for one bit of a byte shifter. The third and last stage of the shifter is provided by the input stage of an accumulator-arithmetic/logic unit. The shifter has the capability of zero fill shifting or rotating a byte, right or left, with a shift count of zero through 7. The first stage, using transistors $Q'_7$ — $Q'_7$, performs an alignment of zero or four positions, depending upon the value of the most significant bit of the shift count. Hence:

$$\overline{J_6} = (\overline{BUS_7} + \overline{SRT_4})\,(\overline{BUS_3} + \overline{SRT})$$

The second stage of the shifter, using transistors $Q'_8$ and $Q'_9$, simultaneously moves the data an additional zero or one positions, i.e.:

$$\overline{S_5} = \overline{J_6}\;\overline{SFT_1} + \overline{J_5}\;SFT_1$$

The third stage, using transistors $Q'_{11}$ – $Q'_{14}$ performs the final zero or two position right alignment, hence:

$$B5 = (S_7 \cdot READ) + S_5 \cdot READ_2)$$

Accordingly, by combinatorial logic, complex shift functions are performed at the repetition rate of the phase clocks. The shifter of FIG. 3 is presented merely as an example of complex logical functions which can be realized with the basic logic circuit. The control signals READ, $READ_2$, SFT1, $BUS_3$, $BUS_7$, SRT, and SRT4 are conveniently provided by microprogramming or conventional control logic.

It is understood that the invention should not be construed as being limited to the form of embodiment described and shown herein which has been given by way of example only, as many modifications and variations may be made by those skilled in or conversant in the art without departing from the gist and scope of the invention.

What is claimed is:

1. Ratioless logic circuits comprising:

A. a first phase logic including
   1. a first precharge, diode connected, transistor,
   2. a storage capacitor,
   3. a first transfer gate transistor connected in series between said first precharge diode and said first storage capacitor,
   4. a first logic network, connected in parallel with said first precharge diode, for selectively discharging said storage capacitor;

B. a second phase logic circuit including
   1. a second precharge, diode connected, transistor,
   2. a storage capacitor,
   3. a second transfer gate transistor connected in series between said second precharge diode and said second storage capacitor,
   4. a second logic network, connected in parallel with said second precharge diode, for selectively discharging said storage capacitor;

C. a common precharge bus connected to said first precharge diode and said second precharge diode;

D. means connecting said first storage capacitor to said second logic network.

2. The logic circuit of claim 1 further comprising:

E. a pair of push-pull transistors, series connected from the gate of said first transfer gate transistor of said first phase logic circuit to ground, for providing a buffered output signal;

F. said second storage capacitor being connected to the first one of said push-pull transistors, for selectively turning it on;

G. a buffer capacitor, connected to the gate of the second one of said push-pull transistors, for selectively turning it on;

H. a control transistor, connected for charging and selectively discharging said buffer capacitor, and having its gate connected to said second capacitor.

3. A dynamic buffer for a ratioless logic circuit in a system having two phase clock buses comprising:

A. a storage capacitor for storing information bits;

B. a pair of push-pull transistors, series connected from one of the clock buses to ground, for providing a buffered output signal;

C. said storage capacitor being connected to a first one of said push-pull transistors, for selectively turning it on;

D. a buffer capacitor, connected to the gate of the second one of said push-pull transistors, for selectively turning it on;

E. a control transistor, connected for charging and selectively discharging said buffer capacitor, and having its gate connected to said storage capacitor in such a manner that said buffer capacitor is discharged when said storage capacitor is charged.

* * * * *